United States Patent [19]

Morimura et al.

[11] Patent Number: 4,789,586

[45] Date of Patent: Dec. 6, 1988

[54] VIBRATION DAMPING METAL PANELS

[75] Inventors: Yasuhiro Morimura, Tokyo; Yukio Fukuura, Kawagoe; Hikaru Ishikawa, Tokyo; Itsuo Tanuma, Sayama; Toshio Honda, Tokyo, all of Japan

[73] Assignee: Bridgestone Corporation, Tokyo, Japan

[21] Appl. No.: 62,662

[22] Filed: Jun. 16, 1987

Related U.S. Application Data

[63] Continuation of Ser. No. 734,217, May 15, 1985, Pat. No. 4,707,397.

[30] Foreign Application Priority Data

May 21, 1984 [JP] Japan .................................. 59-100600
May 31, 1984 [JP] Japan .................................. 59-109721

[51] Int. Cl.$^4$ ................................................. B32B 7/02
[52] U.S. Cl. ...................................... 428/216; 428/414; 428/416; 428/462; 428/463
[58] Field of Search ................. 428/462, 463, 216, 413

[56] References Cited

FOREIGN PATENT DOCUMENTS 3004 1/1972 South Africa .

Primary Examiner—Edith Buffalow
Attorney, Agent, or Firm—Sughrue, Mion, Zinn, Macpeak, and Seas

[57] ABSTRACT

A vibration damping metal panel having an excellent post-workability is disclosed, which comprises two metal plates and an intermediate layer interposed therebetween and composed mainly of (A) at least one rubbery polymer having $\alpha, \beta$-unsaturated carboxylate group in its molecule and (B) a substance selected from polymerizable monomers and mixtures thereof and thermosetting epoxy resins.

3 Claims, 2 Drawing Sheets

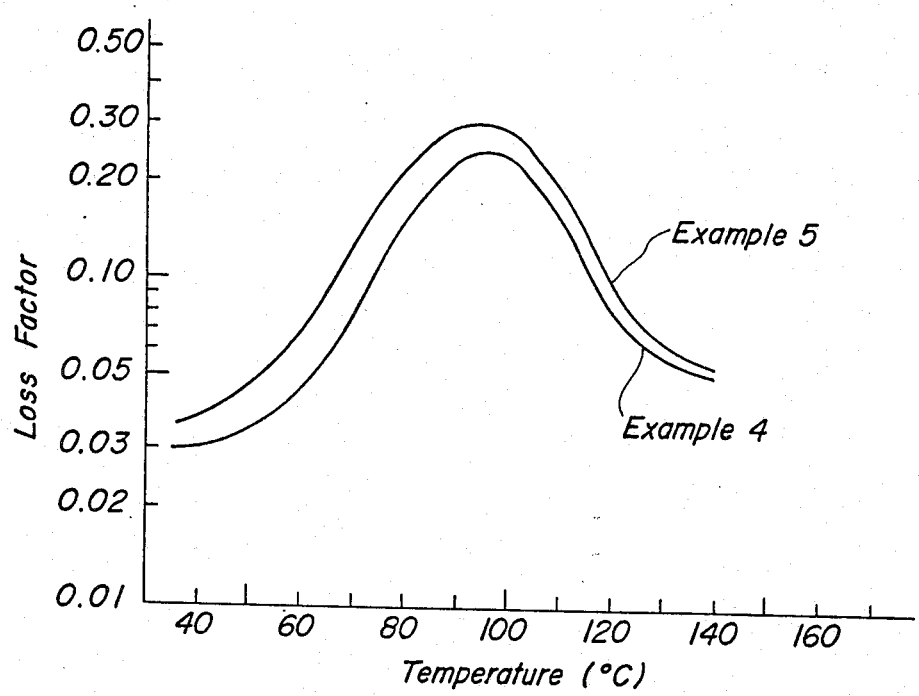
FIG_2
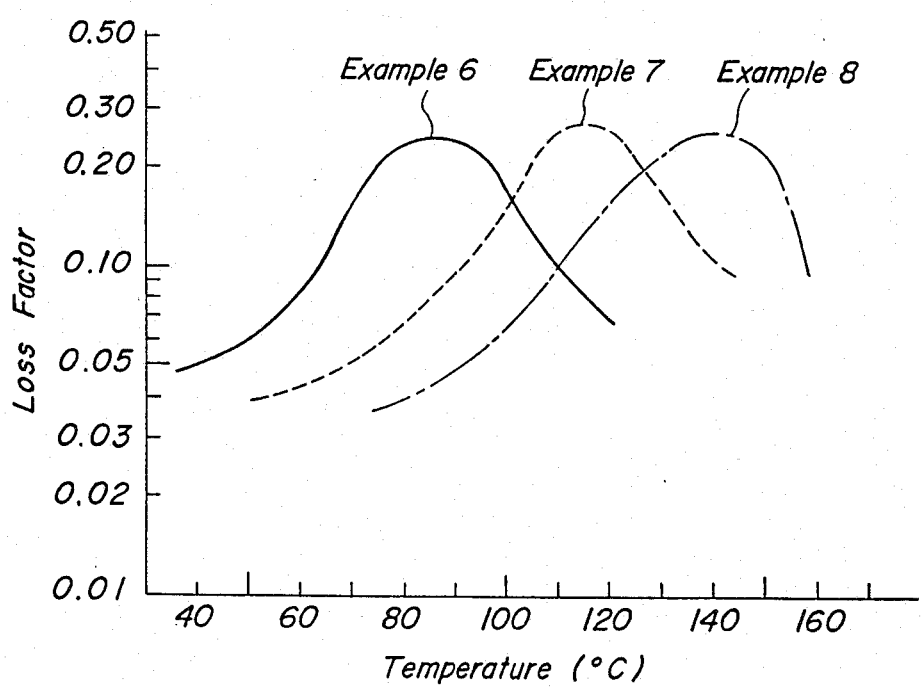
FIG_3

VIBRATION DAMPING METAL PANELS

This is a continuation of application Ser. No. 734,217, filed May 5, 1985 now U.S. Pat. No. 4,707,397.

BACKGROUND OF THE INVENTION

1. Field of the Invention

This invention relates to vibration damping metal panels having an excellent post-workability, and more particularly to a vibration damping metal panel which can easily be subjected to post-working such as overhanging, bending, drawing or the like and has excellent vibration damping properties over a temperature range of 0°–140° C. for reducing noises and vibrations generated from vibration members in vehicles such as automobiles, railroads, airplanes and the like, and various machines such as office machines, electric goods, metal working machines and the like.

2. Description of the Prior Art

With the popularization of vehicles such as automobile, railroad, airplane and the like, and machines such as office machine, electric goods and the like, countermeasures against noises and vibrations generated from these vehicles and machines have recently been highlighted as an urgent subject. In particular, it has strongly been demanded to reduce noises and vibrations generated from the vibration members such as members (oil pan, engine cover, ceiling member, floor member, etc.) arranged around motorcar engine, home electric appliances, metal working machines and the like. For this end, many vibration damping metal panels have been proposed or sold in markets up to the present.

When conventional vibration damping metal panels are estimated in response to such a commercial demand, they have the following various drawbacks and as a result, their application range is considerably limited in practice.

It is a most serious drawback that since a material of an intermediate layer used in the commercially available vibration damping metal panel consists mainly of a thermoplastic self-adhesive, cracks are produced in the intermediate layer by impact stress in the post-working or the buckling is apt to be caused at flange portion in the contraction deformation. Further, the adhesion to metal is very poor and consequently the peeling or deviation from the metal plate occurs. Accordingly, it is very difficult to perform a combined press molding of overhanging, bending, drawing and the like. That is, it is difficult to apply the conventional metal panels to members for automobile, office machines, metal working machines and the like being much in demand and requiring a complicated press moldability.

And also, the vibration damping metal panels manufactured by a very simple press molding include such various problems for practical use that the intermediate layer material flows out or produces decomposition and carbonization at a baking step or drying step of paint, creep is produced at a service temperature under static stress, and peeling of the metal plate occurs.

Furthermore, in view of spot weldability, there is a problem that the intermediate layer in the conventional vibration damping metal panel has no electrical conductivity because it consists only of an organic high molecular material and therefore it is difficult to apply such an intermediate layer to member for automobiles having a great expectation of large demands.

SUMMARY OF THE INVENTION

It is an object of the invention to solve the aforementioned drawbacks of the conventional vibration damping metal panel and to provide vibration damping metal panels having excellent vibration damping properties and post-workability.

According to the invention, there is the provision of a vibration damping metal panel comprising two metal plates and an intermediate layer interposed therebetween and composed mainly of (A) 1–90% by weight of at least one rubbery polymer having in its molecule $\alpha,\beta$-unsaturated carboxylate group represented by the following general formula:

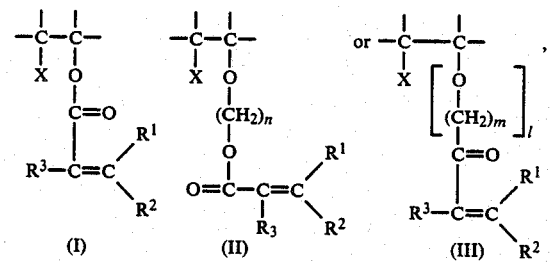

wherein X is a halogen atom selected from Cl, Br and I, each of $R^1$, $R^2$ and $R^3$ is a hydrogen atom or a hydrocarbon residue having a carbon number of 1–10, n is an integer of 2–5, m is an integer of 1–4 and l is an integer of 1–30, and (B) 99–10% by weight of a substance selected from polymerizable monomers and mixtures thereof and thermosetting epoxy resins, said intermediate layer being cured by heating.

In the preferred embodiment of the invention, the intermediate layer further contains 1–100 parts by weight of an inorganic or organic filler and 1–100 parts by weight of a tackifier or 1–50 parts by weight of conductive particles based on 100 parts by weight of the sum of the components (A) and (B).

BRIEF DESCRIPTION OF THE DRAWING

FIGS. 1 to 3 are graphs showing a relation between loss factor and temperature in the intermediate layer of the vibration damping metal panel according to the invention, respectively.

DETAILED DESCRIPTION OF THE INVENTION

Figure 1:
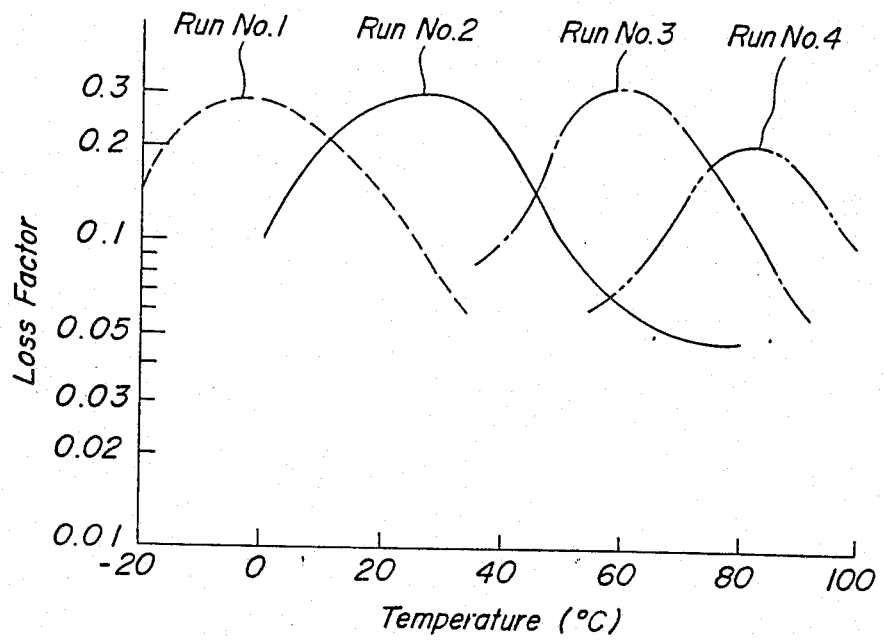

As the metal plate used in the invention, mention may be made of iron, copper, aluminum, zinc, and various alloys thereof. Such metal plates are used in the combination of the same or different plates.

The rubbery polymer used as the component (A) in the invention is a high molecular weight elastomer having an unsaturated bond in its molecule, which includes natural rubber, polyisobutylene, polybutadiene, polychloroprene, butadiene-styrene copolymer, butadieneacrylonitrile copolymer, vinylpyridine-butadiene-styrene copolymer, isobutylene-isoprene copolymer, acrylic acid-butadiene copolymer, methacrylic acid-butadiene copolymer, methyl acrylate-butadiene copolymer, methyl methacrylate-butadiene copolymer, ethylene-propylenecyclopentadiene terpolymer, ethylene-propylene-5-ethylidene-2-norbornene terpolymer, ethylene-propylene-1,4-hexadiene terpolymer, conjugated diene butyl rubber, syndiotactic-1,2-polybutadiene norbornene rubber and the like. The molecular weight of such an elastomer is not critical and can properly be selected in accordance with the use purpose or condition. Particularly, it is preferable to use the elastomer having a molecular weight of more than about 500 in view of the retention of physical properties. Moreover, these elastomers may be used in admixture of two or more elastomers.

Furthermore, $\alpha,\beta$-unsaturated carboxylate group is introduced into the rubbery polymer at a ratio of one group per molecular weight of the polymer of 100–10,000, preferably 100–8,000. As the introduction of $\alpha,\beta$-unsaturated carboxylate group, there is a method of using N-haloamide or alkyl hypohalide (Japanese Patent laid open No. 55-84,307). When the introduction ratio is less than one group per molecular weight of 100–10,000, the properties of the rubbery polymer after the curing, particularly mechanical strength in the bending or overhanging are insufficient.

Among the rubbery polymers, the acrylonitrilebutadiene copolymer has an acrylonitrile content of 15–50%, preferably 25–40%. And also, there are preferably used copolymers having carboxyl group, amino group, hydroxyl group or similar functional group in its terminal or main chain. Further, the acrylonitrilebutadiene copolymer rubber modified with maleic acid can widen an effective temperature range for vibration damping properties without deteriorating the post-workability. That is, it can develop the vibration damping performance at the wide temperature range.

The polymerizable monomer used as the component (B) in the invention includes styrene; derivatives of styrene such as $\alpha$-methylstyrene, $\beta$-methylstyrene, divinylbenzene and the like; acrylic derivatives such as methyl acrylate, methyl methacrylate, tridecyl methacrylate, cyclohexyl methacrylate, tetrahydrofurfuryl methacrylate, dimethylaminoethyl methacrylate, diethylaminoethyl methacrylate, lauryl methacrylate, stearyl methacrylate, glycidyl methacrylate, ethyl dimethacrylate, 1,3-butylene dimethacrylate and the like; vinyl acetate, acrylonitrile, vinylpyridine and so on. These polymerizable monomers may be used alone or in admixture. Further, the thermosetting epoxy resin used as the component (B) in the invention includes diglycidyl ethers of polyhydric phenols as typified by bisphenol A; diglycidyl ethers of polyvalent alcohols as typified by glycerine or propylene glycol; epoxy esters of polybasic acids such as diglycidyl phthalate, diglycidyl adipate and the like; and glycidyl ethers of novolak type phenol resins prepared from phenol, cresol or the like.

In the intermediate layer composed mainly of the components (A) and (B), the amount of the component (A) is 1–90% by weight, preferably 3–80% by weight. When the amount is less than 1%, cracks occur in the intermediate layer due to impact stress in the post-working, particularly press molding, while when it exceeds 90%, the mechanical properties lower. On the other hand, the amount of the component (B) is 99–10% by weight, preferably 97–20% by weight. When the amount exceeds 99%, cracks occur in the intermediate layer due to impact stress in the post-working, particularly press molding, while when it is less than 10%, the mechanical properties lower.

In order to develop the vibration damping properties at high temperature, it is preferable that the intermediate layer is composed mainly of the acrylonitrile-butadiene copolymer rubber and the thermosetting epoxy resin. That is, although the thermosetting epoxy resin is widely used as an adhesive for metal, it has been disregarded that this resin has comparatively high vibration damping properties. On the other hand, according to the invention, such a resin is used as one of the main components in the intermediate layer of the vibration damping metal panel. In case of using the thermosetting epoxy resin alone, however, there are some difficulties in the performance and post-workability since the maximum value of the vibration damping properties is located at a considerably high temperature side and the resin is hard and brittle.

Accordingly, the object of the invention can be accomplished by mixing the thermosetting epoxy resin with acrylonitrile-butadiene copolymer rubber. In this case, it is necessary to mix 100 parts by weight of the thermosetting epoxy resin with 20–200 parts by weight of acrylonitrile-butadiene copolymer rubber. When the amount of acrylonitrile-butadiene copolymer rubber exceeds 200 parts by weight, the bonding force is deteriorated and the post-workability is poor. While, when the amount is less than 20 parts by weight, the maximum value of vibration damping properties is deviated from the aiming temperature range and the hardened film itself is brittle to become difficult in the post-workability.

According to the invention, it is favorable that the well-known inorganic or organic filler is further added to the intermediate layer in an amount of 1–100 parts by weight based on 100 parts by weight of the sum of the components (A) and (B) in accordance with use purposes such as rust prevention, age resistance, cost adjustment, kneading and the like.

As the tackifier used in the invention, mention may be made of solid quasi-polymer resins such as rosin, hydrogenated rosin glycerine ester, polyterpene resin, terpene phenol resin, $C_5$-petroleum resin, $C_9$-petroleum resin, alicyclic hydrogenated pertroleum resin and the like; fluidizable quasi-polymer resins such as Hercolyn (trade name), butone, xylene resin, epoxy resin, polyester, polyacrylic ester and the like; plasticizers such as phthalic ester, aromatic polybasic ester, aliphatic dibasic ester and the like; and high molecular weight low-polymerized substances such as polybutene, polyisobutylene and the like. The tackifier may be added in an amount of 1–100 parts by weight based on 100 parts by weight of the sum of the components (A) and (B).

According to the invention, the intermediate layer composed mainly of the components (A) and (B) and if necessary, containing the filler and the tackifier is interposed between two metal plates. In this case, the thickness of the intermediate layer is adjusted to be within a range of 0.01–1 mm, preferably 0.05–0.5 mm. Then, the resulting assembly is cured by heating to obtain a desired vibration damping metal panel. In order to perform the curing of the intermediate layer, a curing agent may be added to the intermediate layer, if necessary. As the curing agent, mention may be made of ketone peroxides such as methyl ethyl ketone peroxide, cyclohexane peroxide, acetylacetone peroxide and the like; peroxyketals such as 1,1-bis(tert-butyl peroxide)-3,3,5-trimethyl cyclohexane, 1,1-bis(tert-butyl peroxide)cyclohexane and the like; hydroperoxides such as tert-butyl hydroperoxide, cumene hydroperoxide, 2,5-dimethylhexane-2,5-dihydroperoxide and the like; dialkyl peroxides such as di-tert-butyl peroxide, dicumyl peroxide and the like; diacyl peroxides such as acetyl peroxide, isobutyl peroxide, benzoyl peroxide and the like; peroxy dicarbonates such as diisopropyl peroxydicarbonate, dimyristyl peroxydicarbonate and the like; peroxy esters such as tert-butyl peroxy acetate, tert-butyl peroxy benzoate, tert-butyl peroxy maleate, tert-butyl peroxy isopropyl carbonate and the like; aromatic polyamine, urea-melamine-formalin condensate, aliphatic acid or anhydride thereof, alicyclic acid or anhydride thereof, aromatic acid or anhydride thereof, halogenated acid or anhydride thereof, dicyandiamide or anhydride thereof, boron halide complex salt, phenol or derivatives thereof, block isocyanate or derivatives thereof, imidazole or derivatives thereof, and so on. The curing agent may be added in an amount of 1-5 parts by weight based on 100 parts by weight of the sum of the components (A) and (B). Moreover, when the substance other than acrylic substance is used as the component (B), the curing is performed simply by heating without using the curing agent.

In the vibration damping metal panel according to the invention, the bonding force between the metal plate and the intermediate layer is very high and the heat aging resistance and shock resistance are excellent. However, if the spot welding is required to fix the vibration damping metal panel to the other metallic member, it can well be carried out by adding 1-50 parts by weight of conductive particles such as iron powder, mill scale, aluminum powder, copper powder, carbon graphite or the like to 100 parts by weight of the sum of the components (A) and (B).

Moreover, various additives such as a polymerization inhibitor, a catalyst and a cocatalyst for the curing and the like may be added to the intermediate layer in accordance with use purposes.

The following examples are given in illustration of the invention and are not intended as limitations thereof.

EXAMPLE 1

A modified polymer was produced by sufficiently swelling 28 g of polybutadiene (BR-01, trade name, made by Japan Synthetic Rubber K.K.) with 21 g of methacrylic acid and 21 g of methyl methacrylate, homogeneously kneading them on rolls, adding 1.01 g of t-butyl hypochlorite with kneading and leaving to stand at room temperature over a day.

To 100 parts by weight of the above modified polymer was added 20, 40 or 60 parts by weight of a tackifier (alicyclic hydrocarbon resin, Alkon M-100, trade name, made by Arakawa Kagaku Kogyo K.K.) and further 1.0 part by weight of t-butyl peroxy maleate (Perbutyl MA, trade name, made by Nippon Oil and Fats K.K.), whereby three intermediate layers (Run Nos. 1, 2 and 3) were produced.

Regarding the intermediate layers of Run Nos. 1-3, the bonding forces under shear and peel to steel plate of 0.8 mm in thickness were measured according to JIS K-6850 and ISO-4578, respectively.

Further, the intermediate layer of each of Run No. 1-3 having a thickness of 0.1 mm was interposed between two steel sheets each having a width of 25 mm, a length of 300 mm and a thickness of 0.8 mm and then cured by heating at 130° C. for 30 minutes. Then, the temperature dependence of loss factor as a measure for vibration damping properties was measured by mechanical impedance method.

The thus obtained results are shown in FIG. 1 and the following Table 1.

EXAMPLE 2

An intermediate layer (Run No. 4) was produced by homogeneously mixing the following components in the same manner as described in Example 1:
Styrene-butadiene copolymer rubber (Solprene 414, trade name, made by Asahi Kasei Kogyo K.K.): 20 parts
Methacrylic acid: 10 parts
Ethyl methacrylate: 70 parts
Tackifier (terpene resin, YS Resin Px 900, made by Yasuhara Yushi Kogyo K.K.): 35 parts
Cumene hydroperoxide (Percumyl H, trade name, made by Nippon Oil and Fats K.K.): 1 part With respect to the intermediate layer of Run No. 4, the bonding forces under shear and peel and the loss factor were measured in the same manner as described in Example 1 to obtain results as shown in FIG. 1 and Table 1.

COMPARATIVE EXAMPLES 1 AND 2

The conventional vibration damping steel panels each having the intermediate layer composed mainly of polyisobutylene or vinyl acetate were used as Comparative Examples 1 and 2 and then the bonding forces thereof were measured to obtain results as shown in Table 1.

TABLE 1

|  | Run No. | Bonding force under shear (kg/cm²) | Bonding force under peel (kg/25 mm) |
| --- | --- | --- | --- |
| Example 1 | 1 | 145 | 32 |
|  | 2 | 140 | 39 |
|  | 3 | 139 | 28 |
| Example 2 | 4 | 123 | 17 |
| Comparative Example 1 |  | 4 | 7 |
| Comparative Example 2 |  | 13 | 5 |

As a result of studies with respect to the bonding for judging whether or not the post-workability is good, the inventors have sufficiently recognized that the bonding force under shear of not less than 50 kg/cm², preferably not less than 80 kg/cm² and the bonding force under peel of not less than 8 kg/25 mm, preferably not less than 10 kg/25 mm are required for obtaining a good post-workability (press moldability, cutting workability, bending workability and the like).

In the conventional vibration damping metal panels of Comparative Examples 1 and 2 having a problem on the post-workability, the bonding forces under shear and peel are considerably low levels such as 4 kg/cm² and 13 kg/cm² and 7 kg/25 mm and 5 kg/25 mm, respectively, while those of the vibration damping metal panels of Run Nos. 1-3 according to the invention are high levels such as 145, 140 and 139 kg/cm², which are more than 10 times of Comparative Example, and 32, 39 and 28 kg/25 mm, respectively. The latter panels are very excellent in the post-workability.

As to the loss factor, it is desirable that the maximum value of loss factor can freely be set over a wide temperature range. Further, the effective loss factor for the reduction of vibrations is usually said to be not less than 0.05 from a viewpoint of vibration damping properties. In this point, the vibration damping metal panels of Run Nos. 1-3 according to the invention not only develop the vibration damping effect over a very wide temperature range of 60° C., but also have a maximum value of loss factor of 0.3.

Even in the metal panel of Run No. 4, the bonding forces under shear and peel are fairly higher than those of Comparative Examples 1 and 2, and the maximum value of loss factor is 0.2, which show that this panel is excellent in the post-workability and has sufficient vibration damping properties.

EXAMPLE 3

An intermediate layer of Run No. 5 was produced by homogeneously mixing the composition of Run No. 2 in Example 1 with 10 parts by weight of carbon graphite, and then the bonding forces under shear before and after spot welding were measured to obtain results as shown in the following Table 3. In this case, the two-point spot welding was conducted between two steel plates of 1.2 mm in thickness by means of a semisynchronous resistance welding machine (made by Osaka Henatsuki K.K.) under class A condition.

TABLE 2

| Run No. | Bonding force under shear before spot welding (kg/cm$^2$) | Bonding force under shear after spot welding (kg/cm$^2$) |
| --- | --- | --- |
| Example 3 | 5 | 135 | 180 |

In the spot welding, the residue of the composition for the intermediate layer was not contained in the nugget portion, so that the weldability was good. Further, as shown in Table 2, the bonding force under shear before spot welding is very high, so that it is not necessary to perform the spot welding aiming at the reinforcement of the vibration damping metal panel usally used in members for automobile or the like, which largely contributes to enhance the productivity.

EXAMPLE 4

An intermediate layer was prepared by homogeneously mixing the following components:
Epikote 828 (trade name, made by Shell Sekiyu K.K.; epichlorhydrin.bisphenol A type epoxy resin): 100 parts
Epicure YPH-201 (trade name, made by Yuka Shell Epoxy K.K.; amine imide series potential curing agent): 6 parts
Epicure IBMI-12 (trade name, made by Yuka Shell Epoxy K.K.: 1-isobutyl-2-methylimidazole epoxy curing catalyst): 1 part
Aerosil 972 (trade name, made by Nippon Aerosil K.K.; hydrophobic silica): 2.5 parts
Nipol 1702 (trade name, made by Nippon Zeon K.K.; carboxylacrylonitrilebutadiene copolymer rubber): 73 parts The thickness of the resulting intermediate layer was regulated to 0.1 mm to measure a loss factor (which is a measure for the evaluation of vibration damping properties) and a bonding force.

Test for measuring the loss factor was carried out as follows. That is, the above intermediate layer having a thickness of 0.1 mm was interposed between two steel sheets each having a width of 25 mm, a length of 300 mm and a thickness of 0.8 mm and then cured by heating at 150° C. for 30 minutes. Then, the temprature dependence of loss factor was measured by mechanical impedance method to obtain results as shown in FIG. 2.

As seen from FIG. 2, the maximum value in the loss factor of the vibration damping metal panel having the intermediate layer of the above composition is within a range of 80°–100° C., which corresponds to the service temperature of heat-dissipating vibration members for automobile such as oil pan and the like.

With respect to the bonding force, bonding forces under shear and peel were measured according to JIS-K-6850 and ISO 4578, respectively. The thus obtained results are shown in the following Table 3.

TABLE 3

| Example | Bonding force under shear (kg/cm$^2$) | Bonding force under peel (kg/25 mm) |
| --- | --- | --- |
| 4 | 160 | 34 |
| 5 | 158 | 35 |

EXAMPLE 5

The same composition as described in Example 4, except that Nipol 1702 was added with one molecule of maleic acid per about 2,500 of the molecular weight in Nipol by reacting at 70° C. for 5 minutes in a mixer, was used to obtain an intermediate layer, whose loss factor and bonding force were measured. The results are shown in FIG. 2 and Table 3.

As shown in FIG. 2, the use of carboxyacrylonitrile-butadiene copolymer rubber modified with maleic acid was very effective in the increase of vibration damping properties and the widening of temperature range. And also, the bonding force was very excellent.

EXAMPLES 6–8

Three intermediate layers (Examples 6, 7 and 8) were prepared by homogeneosuly mixing the following components:
Epikote 152 (trade name, made by Shell Sekiyu K.K.; phenol-novolak type epoxy resin): 100 parts
dicyandiamide: 6 parts
Aerosil 972: 2.5 parts
Nipol 1702: 109 parts, 54 parts, 36 parts,
and the loss factor and the bonding force thereof were measured to obtain results as shown in FIG. 3 and the following Table 4.

TABLE 4

| Example | Bonding force under shear (kg/cm$^2$) | Bonding force under peel (kg/25 mm) |
| --- | --- | --- |
| 6 | 160 | 35 |
| 7 | 160 | 33 |
| 8 | 156 | 30 |

EXAMPLES 9 AND 10

The same composition as in Example 4 was further mixed with 10 parts of aluminum powder (Example 9) or 10 parts of carbon graphite (Example 10) to obtain a composition for the intermediate layer.

With respect to such compositions, bonding forces before and after spot welding were measured to obtain results as shown in the following Table 5. In this case, the two-point spot welding was carried out in the same manner as described in Example 3.

TABLE 5

| Example | Bonding force under shear before spot welding (kg/cm²) | Bonding force under shear after spot welding (kg/cm²) |
| --- | --- | --- |
| 9 | 153 | 180 |
| 10 | 149 | 179 |

As apparent from Table 5, all panels show a good spot weldability. And also, the bonding force before spot welding was so large that it was possible to widen the distance between spot welding portions applied to the automobile member or the like. Therefore, it was found that they considerably contribute to improve the productivity.

According to the invention, it makes possible to provide vibration damping metal panels, wherein the maximum value of vibration damping properties can be set at an optional temperature within a range of 0°–140° C. and very high vibration damping properties are developed over a wide temperature range. In addition, they have an excellent bonding force capable of performing not only bending process and cutting process but also complicated press molding process combined of overhanging, bending, deep drawing and the like, and a good spot weldability.

Accordingly, the vibration damping metal panels according to the invention can largely be applied to not only the members for automobile having various complicated shapes but also articles such as office machines, metal working machines and the like, and effectively contribute to reduction of vibration and noise in various fields.

What is claimed is:

1. A vibration damping metal panel comprising two metal plates and an intermediate layer interposed therebetween, wherein said intermediate layer is composed of:
   (A) 100 parts by weight of a thermosetting epoxy resin, and
   (B) 20–200 parts by weight of an acrylonitrile-butadiene copolymer rubber or an acrylonitrile-butadiene copolymer rubber having a carboxyl group, amino group or hydroxyl group in its terminal or main chain, wherein said intermediate layer is cured by heating and has a thickness of 0.05 to 0.5 mm.

2. The vibration damping metal panel according to claim 1, wherein said acrylonitrile-butadiene copolymer rubber is modified with maleic acid.

3. The vibration damping metal panel according to claim 1, wherein said intermediate layer further contains 1–100 parts by weight of an inorganic or organic filler, 1–100 parts by weight of a tackifier, 1–50 parts by weight of conductive particles or mixtures thereof, based on 100 parts by weight of the sum of said components (A) and (B).

* * * * *